United States Patent
Takiguchi et al.

[11] Patent Number: 5,924,872
[45] Date of Patent: Jul. 20, 1999

[54] STRUCTURE FOR ASSEMBLING CIRCUIT BODIES ON DOORS

[75] Inventors: Shuji Takiguchi; Keizo Nishitani, both of Shizuoka, Japan

[73] Assignee: Yazaki Corporation, Tokyo, Japan

[21] Appl. No.: 08/893,554

[22] Filed: Jul. 11, 1997

[30] Foreign Application Priority Data

Jul. 15, 1996 [JP] Japan .................................. 8-185135

[51] Int. Cl.⁶ .................................................. H01R 33/00
[52] U.S. Cl. .............................. 439/34; 439/77; 439/246
[58] Field of Search ........................... 174/72 A; 439/34, 439/492, 494, 495, 499, 77, 503, 246–248; 49/502; 296/146.7

[56] References Cited

U.S. PATENT DOCUMENTS

| | | | |
|---|---|---|---|
| 4,824,164 | 4/1989 | Nakayama et al. | 439/34 X |
| 4,848,829 | 7/1989 | Kidd | 439/34 X |
| 4,869,670 | 9/1989 | Ueda et al. | 439/34 |
| 5,527,187 | 6/1996 | Jurasek et al. | 439/246 X |

*Primary Examiner*—Khiem Nguyen
*Attorney, Agent, or Firm*—Armstrong, Westerman, Hattori, McLeland and Naughton

[57] ABSTRACT

A door panel (12) is provided with auxiliaries (2–4) and their respective connectors (7–9), and a door trim (5), which is joined to the door panel, is provided with a circuit body (6) having connectors (30–32) fittable to the connectors (7–9). The door trim (5) has a rib (34) projecting thereon, and end conductors (16a, ...) of the circuit body (6) extend onto the rib (34) to constitute connectors (30–32). The rib (34) is deflectable. The door trim (5) has a circuit body expand and contract member (47) through which the circuit body (6) extends to an automobile body side. The troublesome wiring work of a circuit body on the door panel side is obviated.

8 Claims, 6 Drawing Sheets

STRUCTURE FOR ASSEMBLING CIRCUIT BODIES ON DOORS

BACKGROUND OF THE INVENTION

1. Field of the Invention

This invention relates to a structure for assembling circuit bodies on doors which obviates the troublesome wiring work of circuit bodies on door panels and enables an improved productivity.

2. Description of the Related Art

FIG. 8 shows an assembling structure for assembling circuit bodies on an automobile door which has been proposed in Japanese Patent Application No. 8-128699.

In this structure, various auxiliaries 67–71 and circuit bodies (harnesses) 72, 73 for the auxiliaries are installed on a door inner panel 65 and a door trim 66 which are joined to each other to connect the circuit bodies 72 and 73.

The door inner panel 65 is equipped with a speaker 67, door lock 68 and the like as auxiliaries and further with a connector 75 to be connected to a door mirror driving unit on the side of a door outer panel 74, a connector 76 to be connected to the door trim circuit body 73, and the circuit body 72 that connects the auxiliaries 67, 68, connectors 75, 76 and the like. The circuit body 72 is connector-connected via a rubber-made waterproof grommet 77 at the door front end to a circuit body on the side of an automobile body.

The door trim 66 is equipped with various switches 69, 70, a courtesy lamp 71 and the like, and on its rear surface with the circuit body 73 that connects to these switches, courtesy lamp and the like. The circuit body 73 has a connector 78 to be fitted to the connector 76 on the door inner panel 65 side. The above structure provides improvements in assembly and a reduction in the number of parts required.

With the above structure, however, there are still remain assembling steps of the circuit bodies 72 and 73, of which the assembling step of the circuit body 72 to the door inner panel 65 especially involves troublesome work such as fixation thereof inside a recess 79 at the front end of the door outer panel 74 and insertion thereof through a cylindrical grommet 77. Further, with an existing wiring harness (electric wires) used, troublesome work has been required to pass the same through door panel holes.

SUMMARY OF THE INVENTION

This invention has been accomplished to overcome the above drawbacks and an object of this invention is to provide an assembling structure for assembling circuit bodies on a door, which makes improvements in the troublesome wiring of circuit bodies on a door panel.

In order to attain the object, according to this invention, there is provided a structure for assembling circuit bodies on doors comprising: a door panel; auxiliaries and their respective first connectors provided on the door panel; a door trim to be joined to the door panel; and a circuit body having second connectors fittable to the first connectors, which is provided on the door trim.

Preferably, the door panel comprises inner and outer panels joined to each other.

Preferably, the structure further comprises a rib provided projecting on the door trim, and end conductors of the circuit body extend onto the rib to constitute the second connectors.

Preferably, the rib extends horizontally on the door trim to provide the second connectors in a row arrangement at a height of the door trim, and the first connectors are provided on the door panel in a corresponding row arrangement at a corresponding height of the door panel.

Preferably, the rib is deflectable.

Preferably, the rib has a thin portion at a base thereof at which the rib is deflectable.

Preferably, the first connectors each has a taper guide along which the rib deflects to be guided into the first connectors.

Preferably, the structure further comprises a circuit-body expand and contract means provided on the door trim, through which the circuit body extends to an automobile body side.

The above and other objects, features and advantages of this invention will become apparent from the following description and the appended claims, taken in conjunction with the accompanying drawings in which like parts or elements are denoted by like reference characters.

DESCRIPTION OF THE PREFERRED EMBODIMENTS

Embodiments of this invention will now be described with reference to the attached drawings.

Figure 1:
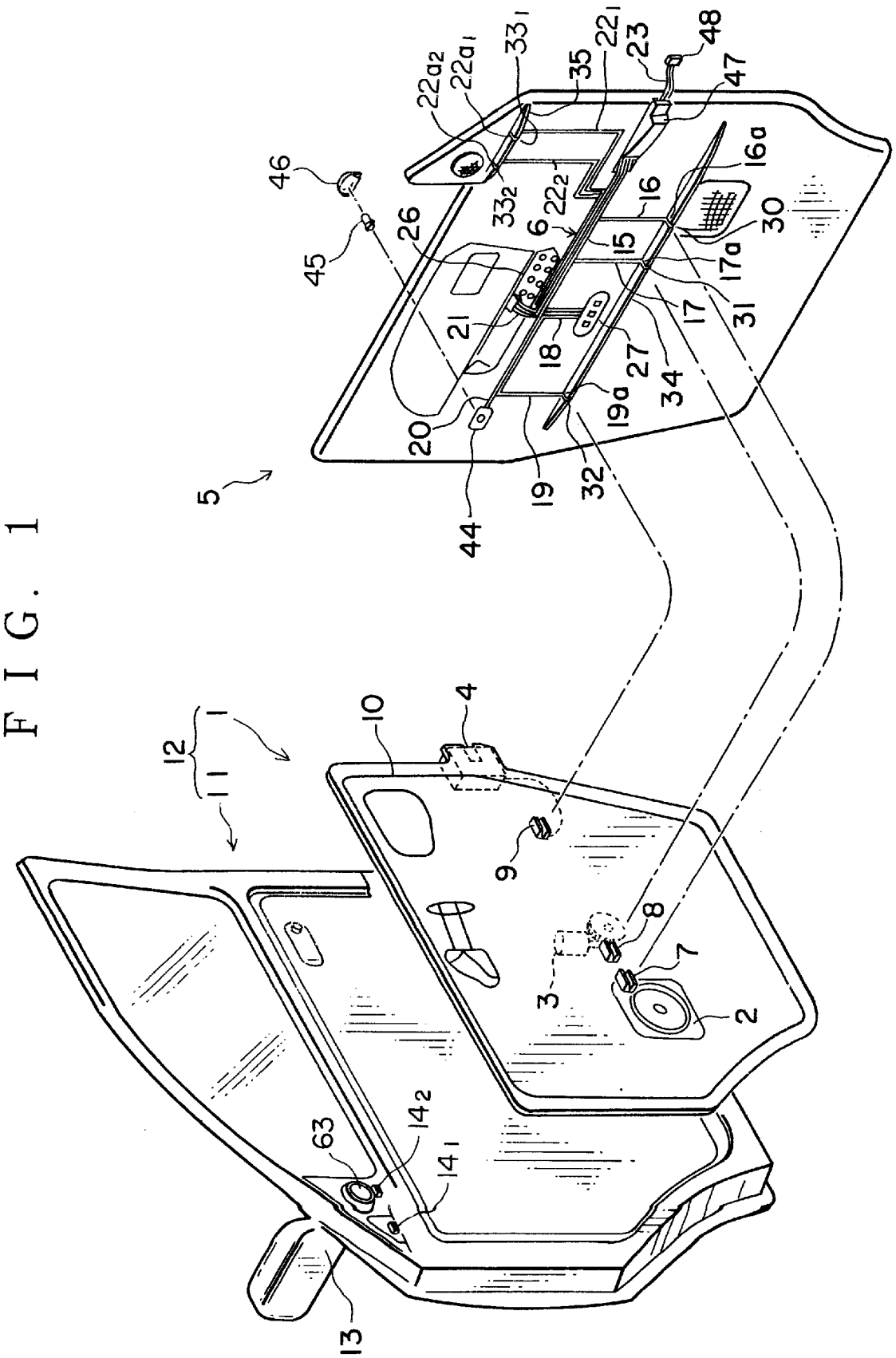
FIG. 1 is an exploded perspective view of a structure for assembling circuit bodies on doors according to one embodiment of this invention.

FIG. 1 shows a structure for assembling circuit bodies on a door according to one embodiment of this invention.

This structure has a feature that an automobile door inner panel 1 is provided with no circuit body, but only with auxiliaries such as a speaker unit 2, power window unit 3 and door lock unit 4, and a door trim 5 is provided with a concentrated circuit body 6.

The auxiliaries 2–4 are arranged substantially in a row at a substantially intermediate height of the door inner panel 1. The auxiliaries 2–4 are provided with their respective connectors 7–9 in a directly contacted or spaced manner, which connectors are horizontally arranged in a straight row at the substantially intermediate height of the door inner panel 1. The door inner panel 1 is on the front surface lined with a waterproof sheet 10 through which each connector 7–9 projects toward the door trim 5.

Figure 2:
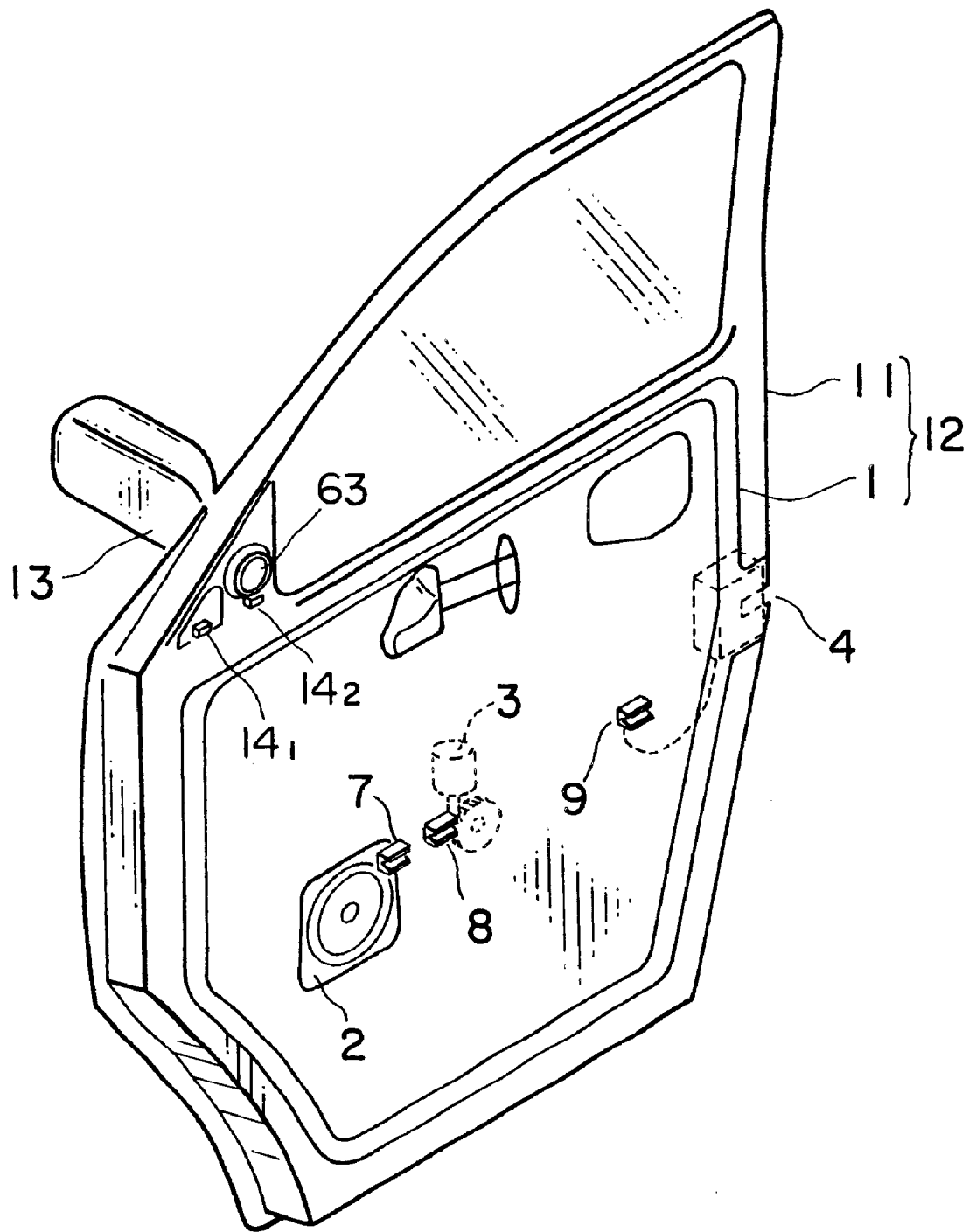
FIG. 2 is a perspective view of door inner and outer panels in FIG. 1 assembled.

The door inner panel 1, as shown in FIG. 2, is joined to a door outer panel 11. The door outer panel 11 is independently provided with a door mirror driving unit 13 and a sub-speaker 63, and has arranged at an upper portion thereof on the front surface a connector $14_1$ for the door mirror driving unit 13 and a connector $14_2$ for the sub-speaker 63. Although the door outer panel 11 and the door inner panel 1 are shown separated, they may also be provided in an integral unit as a door panel 12 insofar as the auxiliaries 2–4 and their connector 7–9 can be rigidly fixed thereon.

In FIG. 1, the circuit body 6 is wired on the rear surface of the door trim 5. The circuit body 6 includes a main circuit portion 15 extending horizontally at a position above an intermediate height of the door trim 5, and branched circuit portions 16–22 ($22_1$, $22_2$) extending vertically (in both up and down directions) and horizontally from the main circuit portion 15. Vertically extended branched circuit portions 18, 21 respectively connect to contact (switch) portions 26, 27 of a main switch unit 24 (FIG. 3) and of an optional switch unit 25.

Figure 3:
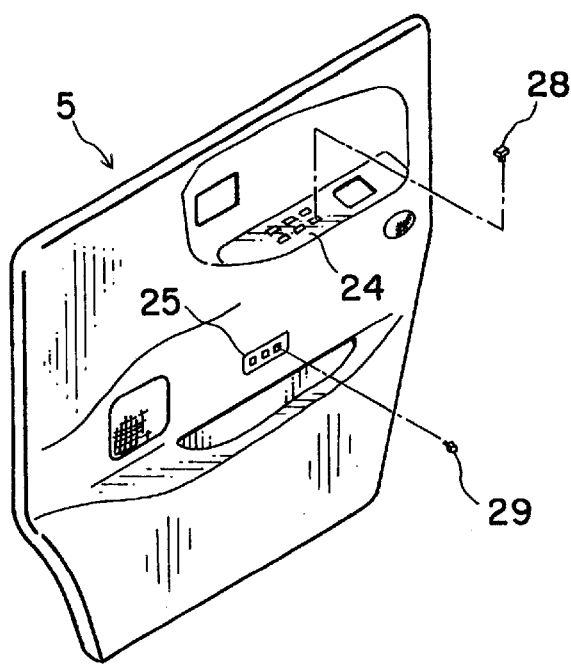
FIG. 3 is a perspective view showing the front side of a door trim in FIG. 1.

Each switch unit 24, 25, as shown in FIG. 3, is mounted at the front side of the door trim 5, and its contact (switch) portion 26, 27 is adapted to be put on and off by the pressing operation of key tops 28, 29. The structure of the switch portions will be described later in conjunction with FIGS. 6 and 7.

In FIG. 1, the vertically extended branched circuit portions 16, 17, 19, $22_1$ and $22_2$ extend downwardly to the substantially intermediate height of the door trim 5 and upwardly to respectively constitute connectors 30–32 and $33_1$, $33_2$ which are fitted to the connectors 7–9 and $14_1$, $14_2$ on the side of the door panel 12 (inner and outer panels 1 and 11).

In other words, horizontal ribs 34, 35 are provided projecting at the substantially intermediate height and at an upper portion (three-cornered portion) of the door trim 5, onto which ribs 34, 35 extend end conductors 16a, 17a, 19a, $22a_1$, $22a_2$ of the branched circuit portions 16, 17, 19, $22_1$, $22_2$ to constitute the connectors 30–32, $33_1$, $33_2$. The ribs 34, 35 are integrally molded with the door trim 5 from synthetic resin material.

The circuit body 6 is integrally three-dimensionally molded on the door trim 5 by a known two-shot method, additive method or the like. Alternatively, the circuit body 6 may be provided in the form of one formed on the door trim 5 through plating or the like, in the form of a flexible flat circuit body, in the form of a wiring harness employing rounded wires or the like insofar as suitable for constituting such connectors as mentioned above.

Figure 4:
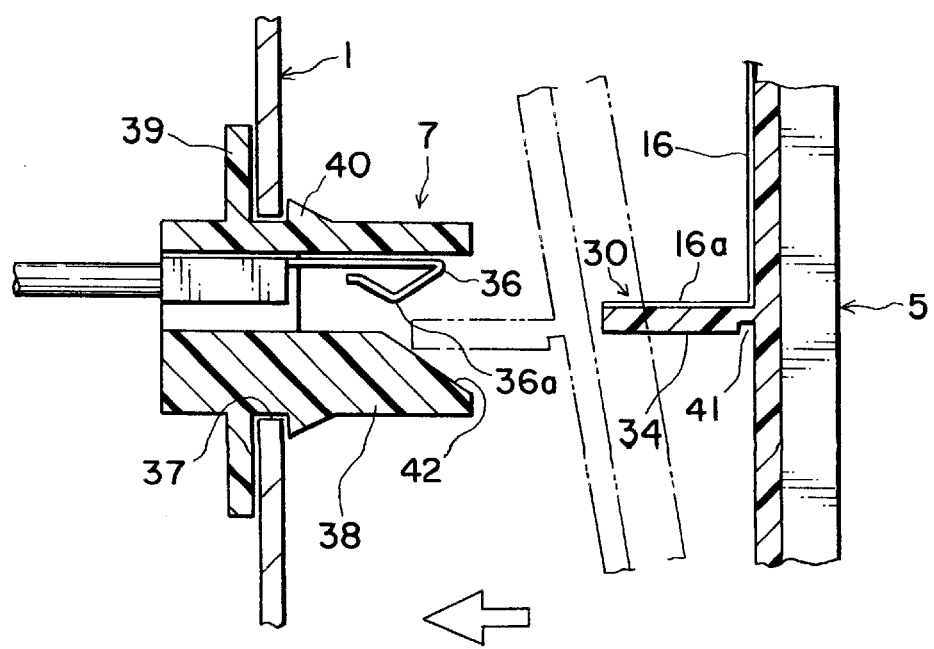
FIG. 4 is a vertical sectional view of a structure in which the door trim is connector-connected to the door panel.

FIG. 4 shows one of these connectors 30 in detail. The rib 34 is inserted into the connector (wait connector) 7 on the door inner panel 1 side to bring the end conductor 16a thereon into contact with the terminal 36 of the mating connector 7 to electrically connect the connectors 7, 30. The connection of the connectors 7, 30 is attained concurrently with the assembling of the door trim 5 to the door panel 12.

Each of the connectors 7–9 extends through and is fixed in an opening 37 provided in the door inner panel 1 as shown in FIG. 4. In other words, a flange 39 and a lock projection 40 project in opposed relation on an outer wall of a synthetic-resin made connector housing 38 and hold therebetween the door inner panel 1 to fix the connector 7–9 in the opening 37. The terminal 36 with a contact spring piece 36a is received in locked position inside the connector housing 38 for contacting the end conductor 16a on the rib 34.

At its base, the rib 34 may include a thin portion 41 whereat the rib 34 is deflectable, so that the rotational assembly of the door trim 5 to the door panel 12 is facilitated. In other words, as indicated by a dotted line in FIG. 4, owing to the thin portion 41, when the door trim 5 is, via a hook (not shown) at an upper end thereof, hooked on the door panel 12 and rotated into assembly to the door panel 12, the rib 34 abuts against a taper guide 42 on the mating connector 7 and deflects to slide upwardly therealong to be smoothly inserted into the connector 7. The detailed structure for the above will be described in another application.

In FIG. 1, the branched circuit portions 16, 17, 19—which extend downwardly from the main circuit portion 15 of the circuit body 6—constitute connectors 30–32 at the rib 34 at the substantially intermediate height of the door trim 5, which connectors are respectively connected to the connectors 7–9 of the speaker unit 2, power window unit 3 and door lock unit 4 on the door inner panel 1. The branched circuit portions $22_1$, $22_2$—which extend upwardly from the main circuit portion 15—constitute connectors $33_1$, $33_2$ at the upper rib 35 on the door trim 5, which connectors are respectively connected to the connector $14_1$ of the door mirror unit 13 and connector $14_2$ of the sub-speaker 63 on the door outer panel 11.

The branched circuit portion 20 on the door trim 5, extending rearwardly from the main circuit portion 15, has a courtesy-lamp connecting portion 44 formed at the end, to which a bulb 45 is connected from the front side of the door trim 5. The bulb 45 is covered with a lens 46. The main circuit portion 15 has its front end portion 23 passing through a circuit-body expand and contract member 47 and protruding beyond the front end of the door trim 5. The front end portion 23 of the main circuit portion 15 is provided with a connector 48 for connecting to an automobile body side.

Figure 5:
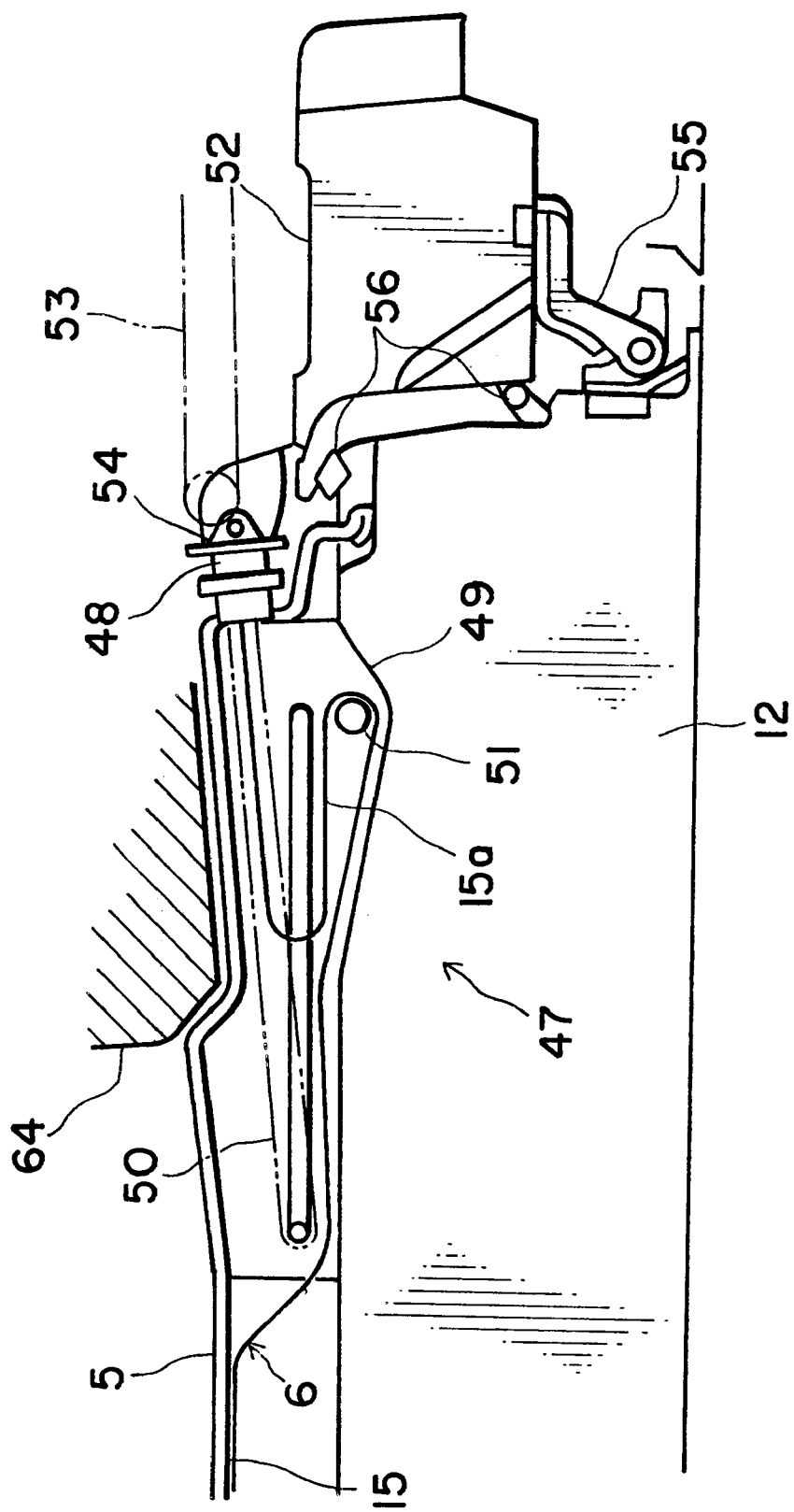
FIG. 5 is a transverse sectional view of a circuit-body expand and contract member on the door trim.

The circuit body expand and contract member 47, as seen from one example thereof shown in FIG. 5 (transverse sectional view), includes a harness receiver 49 formed bulged on the rear surface of the door trim 5, and a syntheticresin made protector 50 front and back slidably engaged in the harness receiver 49. A resilient main circuit 15a is bent substantially in an S-shape inside the harness receiver 49 and connected to the protector 50. The main circuit 15a is fixed to a fixing member 51 inside the harness receiver 49 and extends therefrom in a substantially U-shape to a connector 48 located at the front end of the protector 50, which is connected to a connector 54 of a wiring harness 53 on the side of the automobile body 52. The circuit-body expand and contract member 47 will be described in detail in another application.

In FIG. 5, the door trim 5 is joined to the door panel 12 which in turn is coupled via hinges 55 to the automobile body 52 to be opened and closed. In FIG. 5 the door is closed, the door trim 5 being located beside a side wall of an instrument panel 64. The circuit body 6 on the door trim 5 is located inside the weather strips 56 provided on the door panel 12 and the automobile body 52 and inside the waterproof sheet 10 (FIG. 1) on the door panel 12 to be protected from the outside and sealed against water. The connection of the connectors 48 and 54 is effected on the side of the cabin. Thus, it becomes unnecessary to provide a circuit body on the door panel side.

On opening the door, the protector 50 slides forwardly to project out of the harness receiver 49, and the main circuit portion 15 of the circuit body 6 expands integrally therewith. On closing the door, the protector 50 slides rearwardly to be received, together with the circuit body 6, inside the harness receiver 49 as shown in FIG. 5. The circuit-body expand and contract member 47 absorbs the bending of the circuit body 6 on opening and closing the door.

Figure 6:
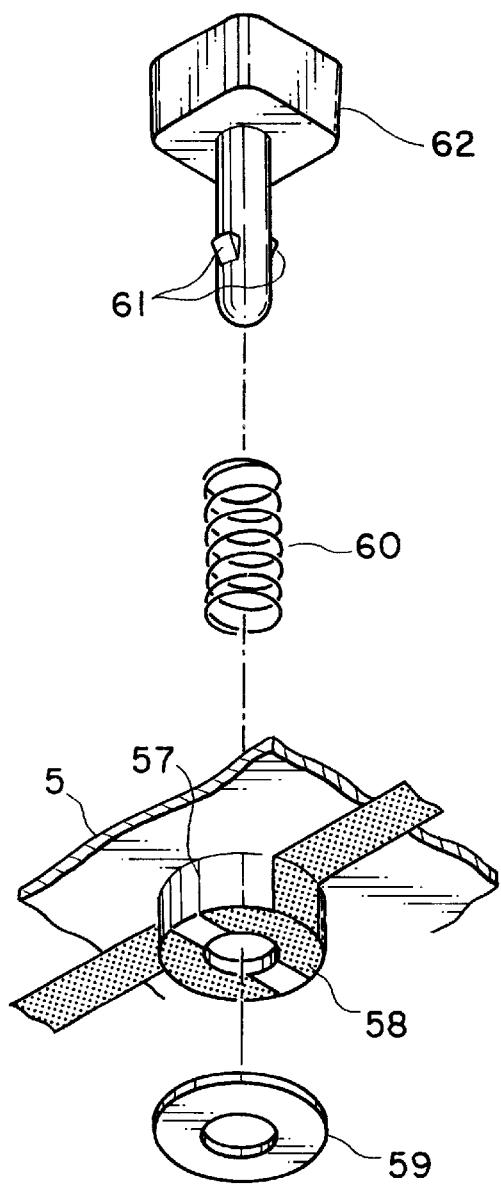
FIG. 6 is an exploded perspective view of a switch structure on the side of the door trim.
Figure 7:
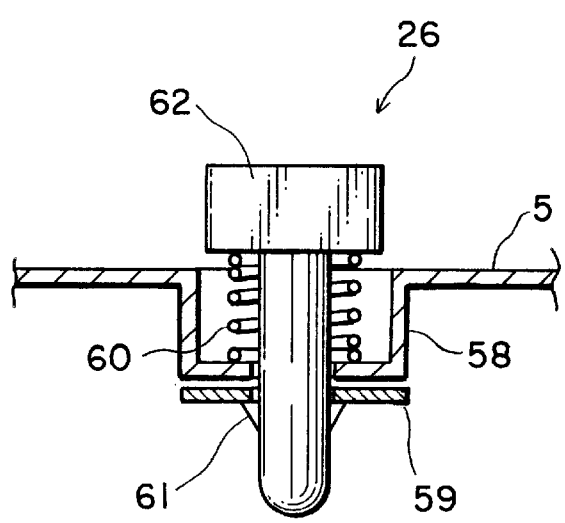
FIG. 7 is a vertical sectional view of the switch structure in FIG. 6.
Figure 8:
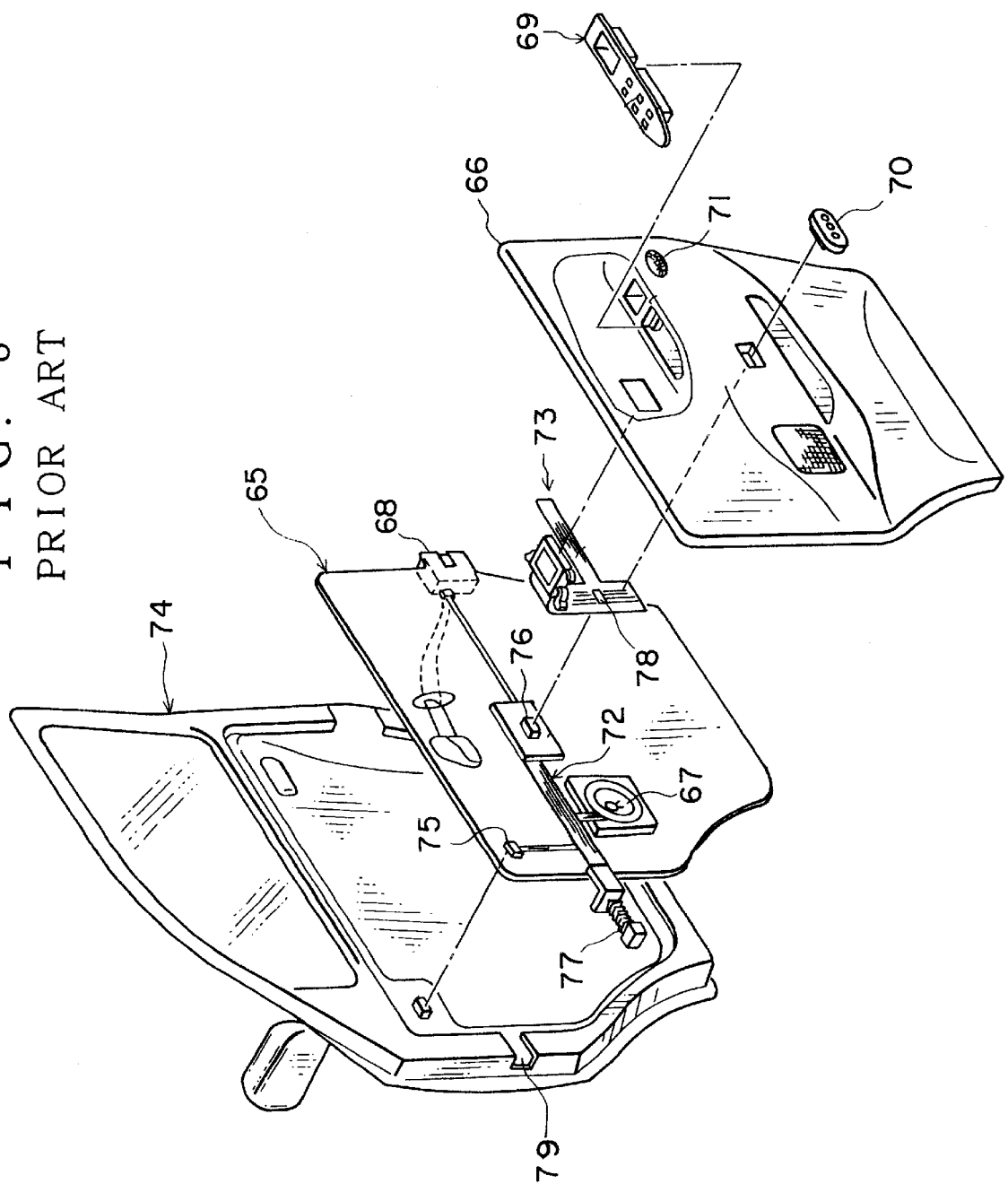
FIG. 8 is an exploded perspective view of a conventional structure for assembling circuit bodies on automobile doors.

FIGS. 6 and 7 show one example of a structure of the switch portion 26 as mentioned hereinabove.

The switch portion 26 is made up of a ring-shaped portion 57 formed projecting at the underside of the door trim 5, a circuit conductor 58 extending from the underside of the door trim 5 onto the ring-shaped portion 57 and cut separated at a center on the ring-shaped portion 57, a movable contact 59 positioned opposed to the ring-shaped portion 57, a spring 60 on a side of the ring-shaped portion 57 opposite the contact 59, and a key 62 passed through the spring 60 to be normally biased upwardly and through the ring-shaped portion 57 have its claws 61 lockingly engage the movable contact 59. As shown in FIG. 7, the key 62 when in a released state brings the movable contact 59 into contact with the circuit conductor 58 to energize the circuit and when pressed cuts off the circuit.

As mentioned hereinabove, according to this invention, because the assembling work of a circuit body on the door panel side is obviated, the troublesome passing work of a wiring harness through door panel holes and through a grommet as in the past becomes unnecessary, leading to a great improvement in the workability and productivity. Further, because the wiring of a circuit body on the door panel is obviated, a structural change of the door panel for each grade of an automobile becomes unnecessary, leading to a reduction in the cost based on the common use of the same door panel.

Further, according to this invention, connectors are formed concurrently with the molding of a door trim, which connectors have a simplified structure and are light in weight. Further, in the assembling work of a door trim by hooking a door trim at the upper end on the door panel and rotating the door trim into assembly to the door panel, the rib is inserted along a taper guide to attain a reliable connector-connection. Besides, the bending of a circuit body on opening and closing the door is absorbed by the circuit-body expand and contract member, thereby preventing the circuit body from being bitten on closing the door.

Having now fully described the invention, it will be apparent to one of ordinary skill in the art that many changes and modifications can be made thereto without departing from the spirit and scope of the invention as set forth herein.

What is claimed is:

1. A structure for assembling circuit bodies on doors comprising:

a door panel;

auxiliaries and their respective first connectors provided on said door panel, said door panel having substantially no circuit body thereon;

a door trim to be joined to said door panel;

a circuit body provided on said door trim, said circuit body having second connectors fittable to said first connectors when said door trim is mounted on said door panel; and an elongated rib provided projecting from said door trim, wherein end conductors of said circuit body extend onto said elongated rib at at least two spaced positions to constitute said second connectors, and said first connectors on said door panel are in a corresponding spaced, row arrangement.

2. The structure according to claim 1, wherein said door panel comprises inner and outer panels joined to each other.

3. The structure according to claim 1, wherein said elongated rib extends horizontally on said door trim, and said first connectors are in a corresponding horizontally extended row arrangement.

4. The structure according to claim 1, wherein said elongated rib is deflectable.

5. The structure according to claim 4, wherein said rib has a thin portion at a base thereof at which said rib is deflectable.

6. The structure according to claim 4, wherein said first connectors each has a taper guide along which said rib deflects to be guided into said first connectors.

7. The structure according to claim 1, further comprising a circuit-body expand and contract means provided on said door trim, through which said circuit body extends to an automobile body side.

8. The structure according to claim 1, wherein said first connectors on said door panel are female connectors, and said second connectors on said door trim are male connectors.

* * * * *